United States Patent [19]

Lindgren

[11] Patent Number: 4,831,300
[45] Date of Patent: May 16, 1989

[54] BRUSHLESS ALTERNATOR AND SYNCHRONOUS MOTOR WITH OPTIONAL STATIONARY FIELD WINDING

[76] Inventor: Theodore D. Lindgren, 6318 Cherry Hills Rd., Houston, Tex. 77069

[21] Appl. No.: 128,716

[22] Filed: Dec. 4, 1987

[51] Int. Cl.$^4$ .................... H02K 19/26; H02K 47/04
[52] U.S. Cl. .................................. 310/190; 310/113; 310/266
[58] Field of Search ............. 310/105, 106, 196, 113, 310/114, 166, 190, 254, 261, 266

[56] References Cited

U.S. PATENT DOCUMENTS

| | | | |
|---|---|---|---|
| 1,933,498 | 10/1933 | Morrill | 310/211 |
| 3,469,124 | 9/1969 | Willcox | 310/266 |
| 3,532,916 | 10/1970 | Fisher | 310/266 |
| 4,714,854 | 12/1987 | Oudet | 310/268 |

FOREIGN PATENT DOCUMENTS 1249717  11/1960  France .................... 310/266

Primary Examiner—Peter S. Wong
Assistant Examiner—D. L. Rebsch
Attorney, Agent, or Firm—Theodore D. Lindgren

[57] ABSTRACT

An alternator/synchronous motor structure provides varying-reluctance paths for radially directed, unidirectional magnetic fields by means of a unique rotor-stator configuration in which inner- and outer-rotor poles and a rotor pole-connecting means surround one end and the inner- and outer-cylindrical surfaces of a hollow cylindrical stator. At least one of the inner or outer poles includes at least one field concentrator member. Optional excitation field may be provided by a stationary winding requiring no brushes for energizing or by permanent magnetization.

23 Claims, 3 Drawing Sheets

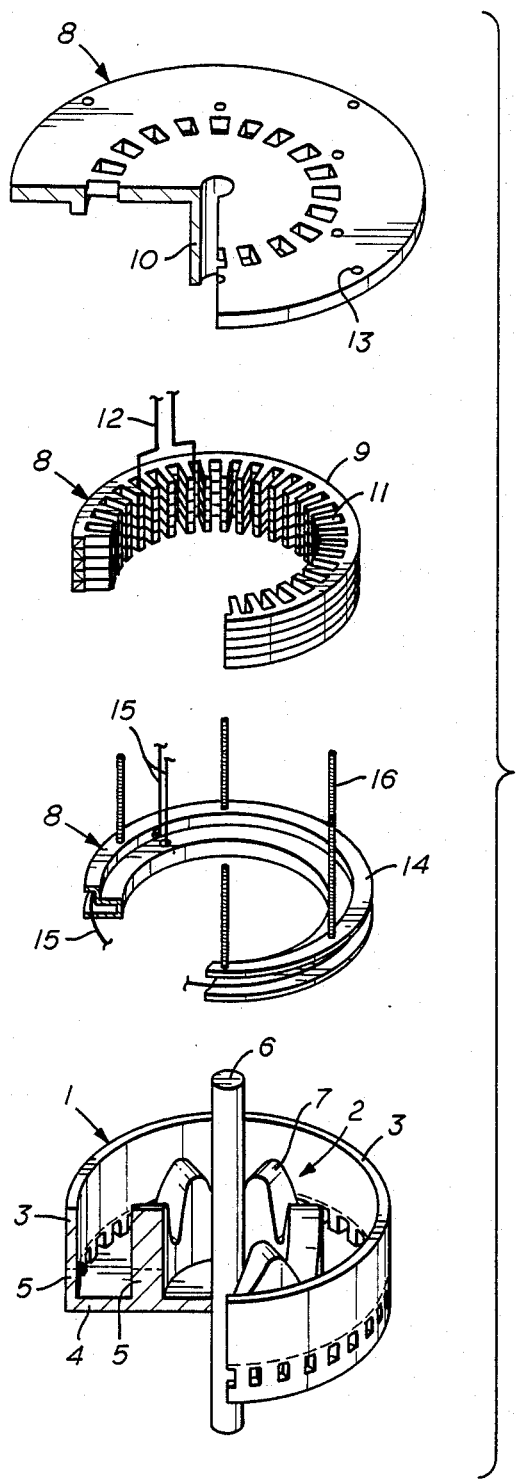
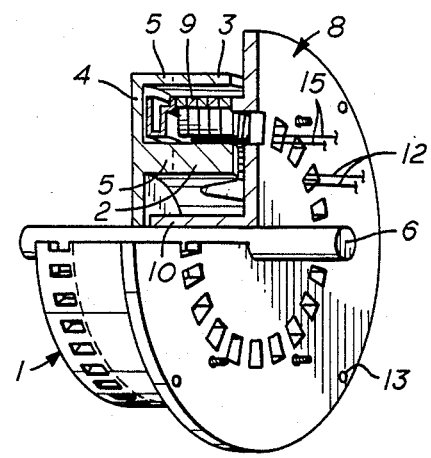
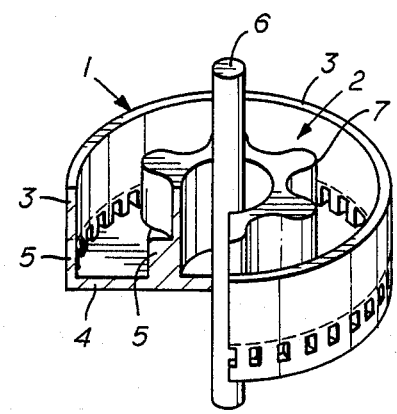
FIG. 1
FIG. 2
FIG. 3

BRUSHLESS ALTERNATOR AND SYNCHRONOUS MOTOR WITH OPTIONAL STATIONARY FIELD WINDING

RELATED APPLICATIONS

This application is related to U.S. patent application Ser. No. 07/128,719, Dual-Rotor Induction Motor With Stationary Field Winding; to U.S. patent application Ser. No. 07/128,718, Transformer and Synchronous Machine With Stationary Field Winding; and to U.S. patent application Ser. No. 07/128,717, Inductive Torque Transmitter With Stationary Field Winding; all of which were filed by the same inventor on the same date as this application.

BACKGROUND OF THE INVENTION

1. Field of the Invention

This invention is in the field of electrical generator and motor structures, including specific fields relating to brushless alternator structures and brushless synchronous-motor structures. Specific fields of the invention also include permanent-magnet, motor-generator devices and include methods for construction of those devices without using permanent magnets.

2. Description of the Prior Art

Prior-art synchronous alternators and electrical motors are, in commercially successful form, constructed with rotors and stators in which hollow, cylindrical, laminated, magnetic cores of the stators surround the magnetic portions of the rotors. The excitation field windings of alternators and of excitation-type motors are usually mounted on the rotors of such prior-art devices. Energizing of the field windings is typically accomplished through use of brush connections that conduct current from and to direct-current electrical-energy sources that are external to the rotors or, in some brushless machines, through direct-current electrical-energy sources fabricated within the rotor structures. Structures having either brushes or internal rotor field energizing circuits require a relatively large number of parts and, therefore, increased cost of manufacture. Maintenance costs are also increased because of the limited life span of brushes and other parts.

Permanent-magnet rotors, rather than energized rotor field windings, are sometimes used in alternator and in motor applications where transient loads or adverse environmental conditions do not cause demagnetization. Varying-reluctance rotors with no excitation field are sometimes used for synchronous-motor applications having relatively low torque requirements. Prior-art structures having either permanent-magnet rotors or varying-reluctance rotors are, in general, also constructed with rotors surrounded by laminated stator cores.

The stator magnetic fields of conventional synchronous machines are associated with phased alternating-currents flowing through windings mounted on the stators. The constant-rotating-magnitude magnetic fields associated with stator windings typically enter and leave the laminated stator cores at separate fixed locations on the cylindrical inner surfaces of the cores, requiring field paths having tangential direction through the stator cores. The rotating fields associated with rotor-mounted windings and permanent-magnet rotors enter and leave the stator cores at separate rotating locations on the cylindrical inner surfaces, also following tangential paths through the cores. Therefore, the stator cores of prior-art structures must have radial thicknesses of sufficient dimension that the combined rotor and stator magnetic fields do not saturate while moving in tangential paths within the cores.

Hysteresis losses in the ferrous stator cores of commercially successful prior-art devices are relatively large because the combined rotor and stator magnetic fields reverse direction at every point in the stators with each cycle of alternating-current and corresponding rotation of the rotors. The hysteresis losses per unit volume would be decreased if the magnetic fields in the stator cores did not reverse directions, but varied in only one direction between a minimum value and a maximum value during each cycle, thus avoiding operation involving the major hysteresis loops of the magnetic materials.

While prior-art disclosures include brushless alternator and synchronous-motor structures having stationary excitation windings that produce magnetic fields associated with the rotors, those prior-art structures have not been commercially successful, apparently because of expensive and complex magnetic circuitry or because of adverse eddy-current effects in less complex magnetic circuitry. No known prior-art structure having a stationary excitation winding has disclosed a rotor-stator combination that minimizes adverse effects of eddy currents and hysteresis in both stator and rotor through use of a simple and energy-efficient design in which radial, time-varying magnetic fields need not reverse direction in the stator and in which a laminated stator core of simple construction may have a volume equivalent to that of conventional machines with similar operating specifications and with similar construction materials.

BRIEF SUMMARY OF THE INVENTION

This invention includes a rotor-stator structure for synchronous machines such as alternators and synchronous motors. The structure includes inner- and outer-rotor poles and a rotor-pole connector that surround one end of and the inner- and outer-cylindrical surfaces of a hollow cylindrical stator on which alternating-current windings are mounted. At least one of the rotor poles includes magnetic field concentrators.

In one of its embodiments, this invention discloses a stationary field winding attached to one end of the stator core, rather than to the rotor as in conventional machines. The combined, constant-rotating-magnitude stator and rotor magnetic fields increase an decrease primarily in unidirectional and radial manner through the stator core, entering and leaving from fixed points on the inner and outer core surfaces. The brushless alternator/synchronous-motor structure of the embodiment has performance capability that is equal to or better than conventional brush-type machines having similar electrical specifications and physical dimensions, yet may be constructed with fewer parts and at less expense.

In another embodiment, this invention discloses a machine having a permanently magnetized rotor-pole-connecting means rather than the stationary concentric field winding of the previously described embodiment. In the permanent magnet embodiment, the combined constant-rotating-magnitude stator field and rotating rotor field also increase and decrease primarily in unidirectional and radial manner through the stator core, entering leaving from fixed and rotating points respectively on the inner and outer core surfaces.

In yet another embodiment, this invention discloses a synchronous reluctance-motor device.

The rotor-stator structure disclosed in this invention may utilize a rotating field winding energized through brush connections, as in conventional machines.

When constructed with ferrous stator cores, this invention provides alternators and synchronous motors that are capable of operation with less hysteresis energy losses than those of equivalent conventional machines. Because the time-varying magnetic fields will generally pass through the stator cores without reversing direction, hysteresis loss per unit volume will, in general, be less than that of conventional machines having the same magnetic-field operating characteristics and laminated materials. Laminated stator cores of the machines of this invention may have approximately the same dimensions or volume as conventional machines designed for similar applications and constructed of similar materials. Therefore, total hysteresis losses may be decreased.

This invention provides a solution to a long-standing and previously unsolved problem by providing a practical structure for construction of synchronous machines having stationary field windings. The solution structure has no laminated parts in the rotor, allows use of a stator with simple laminated core construction, and minimizes eddy-current and hysteresis losses in both rotor and stator.

BRIEF DESCRIPTION OF THE DRAWINGS

FIG. 1 is an isometric, axially expanded depiction, in partial cross-section, of the invention as embodied with speed-to-frequency ratio of 10 revolutions per minute per Hertz, with sinusoidally shaped concentrators having uniform-length air gaps, with minimized energy radiation, with laminated core, with slots for three-phase windings, and with stationary field winding.

FIG. 2 is an isometric view, in partial cross-section, of the assembled embodiment depicted in FIG. 1.

FIG. 3 is an isometric depiction, in partial cross-section, of an alternate rotor embodiment illustrated for use with the other parts of the structure of FIG. 1, the alternate rotor embodiment indicating concentrators having non-uniform-length air gaps.

DETAILED DESCRIPTION OF THE PREFERRED EMBODIMENTS

Figure 4:
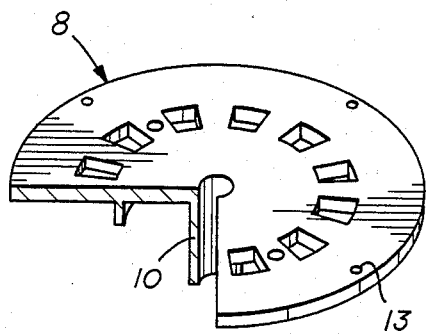
FIG. 4 is an isometric, axially expanded depiction, in partial cross-section, of the invention as embodied with a speed-to-frequency ratio of 30 revolutions per minute per Hertz, with half-sinusoid concentrators having uniform-length air gaps, with laminated core, with sots for two-phase windings, and with permanent-magnet excitation.
Figure 4:
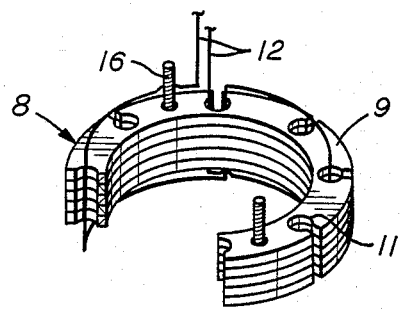
Figure 4:
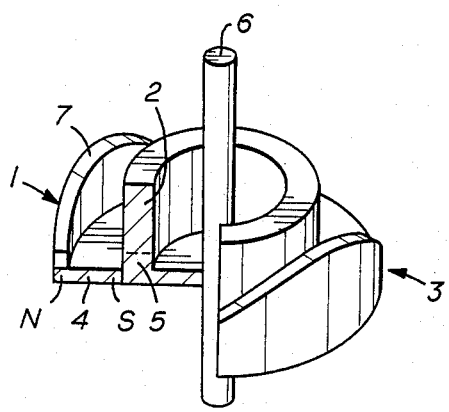

Referring to FIGS. 1 and 2, rotor 1 includes a cylindrical inner-pole member 2 and a cylindrical outer-pole member 3, both pole members 2 and 3 being concentrically attached to, or formed with, annular pole-connecting means 4 such that poles 2 and 3 extend from the same side of connector 4. Connector 4 is illustrated in FIGS. 1 and 2 as a disc with, in this embodiment, cylindrical flanges or extensions 5 which attach pole members 2 and 3. Pole members 2 and 3 are fabricated using material having relatively high magnetic permeability. Connector 4 is fabricated using material having relatively high magnetic permeability in at least that portion, including extensions 5, between poles 2 and 3. Rotor positioning means 6 is illustrated as a shaft concentrically attached to, or formed with, members 2 and 3 and connector 4. As is well-known, rotor positioning means 6 may be a hollow cylindrical journal part rather than the shaft illustrated. Field concentrator members 7 are illustrated as forming inner pole 2.

Stator 8 includes hollow cylindrical stator core 9 positioned concentrically by rotor positioning means 6 and be concentrically attached stator positioning means 10 such that inner- and outer-cylindrical surfaces of stator core 9 form air gaps between the outer-cylindrical surfaces of inner pole 2 and the inner-cylindrical surface of outer pole 3. As is well-known, stator positioning means 10 may be a shaft rather than the hollow cylindrical journal part illustrated. The axial length of stator core 9 generally defines the axial length of poles 2 and 3 for the purposes of this description. Core 9 is illustrated in FIGS. 1 and 2 with a high-magnetic-permeability configuration including, as in prior-art machines, layers of sheet steel separated by material having relatively high electrical resistivity. The inner-cylindrical surface of core 9 contains slots 11 for alternating-current windings 12, only one of which is indicated. Subject to a restriction explained elsewhere herein, windings 12 are positioned in slots 11 according to methods that are well known in the prior art pertaining to synchronous machines. Windings 12 may includes insulated conductive or superconductive materials. Slots 11 may be of depth that extends through much of the radial thickness of core 9. Optional mounting means 13 may be used to attach stator 8 to a reference structure, not illustrated. As is well-known, reference structures may include custom and standard frames or brackets for attachment to moving and stationary objects of assorted and sundry descriptions.

Field excitation, optional for motor structures, is illustrated in FIGS. 1 and 2 as stationary field winding 14 including conductor 15 and attaching means 16 for attachment to stator means 8. Attaching means 16, as shown, also attaches core 9 to stator positioning means 10 and to mounting means 13 and, therefore, may not be optional. Attaching means 16 may be used to attach core 9 directly to a reference structure that includes a stator positioning means 8. Such reference structures include, for example, gasoline and turbine engines and other sources of mechanical energy.

Without a field winding 14 or other excitation, the structure operates as a synchronous reluctance motor.

During operation of the device of FIGS. 1 and 2, a direct current is applied to field winding 14 through the ends of field conductor 15. Windings 12 are connected, as in prior-art machines, to a preferably phase-balanced, alternating-current source or to a preferably phase-balanced load. The currents in field winding 14 and windings 12 produce magnetic fields that extend through paths consisting of inner and outer poles 2 and 3, connector 4, stator core 9 and the short air gaps between core 9 and poles 2 and 3. The magnetic flux in stator core 9 is concentrated in the regions adjacent to concentrators 7. As rotor means 1 turns, the change in total magnetic flux passing through a stator winding 12 will be a maximum at the point in time that a rotating concentrator 7 is approximately centered with respect to a slot 11 holding one conductor of that winding 12. Similarly, the change in total magnetic flux decreases to a minimum at the point in time that a rotating concentrator 7 is approximately centered between any two slots 11, each containing a conductor of a stator winding 12 or a conductor of a neighboring winding having the same phase assignment. The current in field winding 14 may be adjusted to obtain a desired power factor in the event that windings 12 are connected to a large-capacity source of voltage. In other applications, the current in field winding 14 may be adjusted to optimize voltage and/or alternating-current during changes in operating speed, frequency or load.

Torque may be transmitted to or from any part of rotor means 1. For example, a belt pulley for torque transmission may be attached to shaft 6 or may be formed with connector 4 or with outer pole 3.

Field concentrators 7 of rotor 1 are indicated in FIGS. 1 and 2 as being shaped with uniform-length air gaps between each concentrator 7 and stator core 9, but may be rectangular or cylindrical with non-uniform-length air gaps as illustrated in FIG. 3. The cylindrical shape of concentrators 7 is illustrated in FIG. 1 as sinusoidal but may, for example, be half-wave sinusoidal with uniform air gap, as illustrated in FIG. 4 and as suggested for use in prior-art machines. Unlike typical prior-art machines, concentrators 7 need not be separated from each other by air gaps, but may to include longitudinal bars attached to, or formed on, the closed cylindrical surface of a cylindrical pole member 2 or 3, as illustrated in FIG. 3. The shapes of concentrators 7 should generally be fabricated to produce an air-gap magnetic-flux distribution that is offset sinusoidal as a function of angle if the machine is to be used for applications that require single-frequency sinusoidal voltages and currents. However, for applications that do not require single-frequency sinusoidal voltages and currents, concentrators 7 may, for example, have the trapezoidal shape used in automotive applications and illustrated in FIG. 5 or may have a rectangular or other shape and may or may not have uniform-length air gaps. Concentrators 7 may be formed to have increased thickness at the end near connector 4 to provide improved structural integrity, to provide more uniform magnetic flux density throughout each such concentrator 7, and to minimize weight of the structure.

The number of concentrators 7 used is dependent upon the speed-frequency relation desired. The ratio of rotational speed, measured in revolutions per minute, to frequency, measured in Hertz, is equal to sixty divided by the total number of concentrators 7 on a pole 2 or 3.

Figure 5:
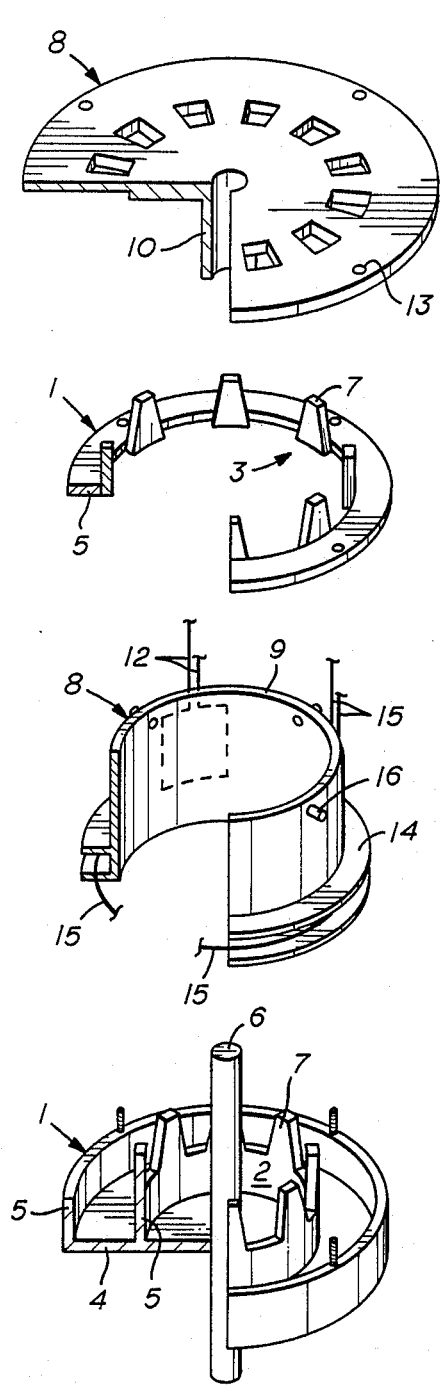
FIG. 5 is an isometric, axially expanded depiction, in partial cross-section, of the invention as embodied with a speed-to-frequency ratio of 7.5 revolutions per minute per Hertz, with trapezoidal-shaped concentrators on both inner and outer poles, with low-energy-loss stator core, with stationary field winding, and with outer pole constructed separately from the remainder of the rotor.

For some applications, it may be desirable for concentrators 7 to be included in outer pole 3 rather than inner pole 2, as illustrated in FIG. 4. In that event, slots 11 for alternating-current windings 12 should be located on the outer surface of stator core 9, also as illustrated in FIG. 4. In yet other applications, concentrators 7 may be included in both inner and outer poles 2 and 3, as illustrated in FIG. 5. For those other applications, inner and outer concentrators 7 should be paired along the same radii if the design objective is to minimize the radial thickness of stator core 9 and thereby maximize electromechanical energy transfer efficiency. Use of concentrators 7 on only one of poles 2 and 3 is recommended for motor applications because less restricted eddy-current flow in the pole lacking concentrators 7 will assist in causing rotor means 1 to reach synchronous speed during start-up. Using concentrators 7 in the shape of bars formed on a closed cylindrical surface will also assist start-up through increased change in magnetic flux and through less restriction of eddy-current flow. Generally, a pole 2 or 3 either lacking concentrators 7 or having bar-type concentrators 7 on a closed cylindrical surface should be located on the outer radius of rotor 1 to minimize radiation of energy at frequencies that may cause undesired interference with operation of any nearby electronic equipment.

Operation of the machine will cause positively and negatively charged regions in the inner and outer portions of poles 2 and 3 and of connector 4 because the magnetic fields from stationary windings 12 and 14 do not rotate. For applications at usual rotational speeds, the electric fields associated with those charges may be ignored.

Connector 4 may include spokes and extensions 5 may to include extensions of those spokes. For example, a rotor 1 designed with concentrators 7 on both poles 2 and 3 allows use of a connector 4 composed of spokes only. The design of connector 4 depends on the type of concentrators 7 selected as well as the fabrication process used. Connector 4 may serve as a cooling fan for stator means 8 by shaping spokes as axial fan blades or by forming an inner centrifugal fan that discharges air through ventilation holes in extensions 5 of outer pole 3. Connector 4 may be thicker at inner radii than at outer radii to maintain a more uniform magnetic flux density.

Stator core 9 is preferably constructed to have the smallest volume possible without causing the magnetic flux density to exceed saturation limitations. For usual applications, stator core 9 may be designed to minimize energy losses and yet allow a highly permeable and generally radial path for magnetic fields through use of a conventional laminated structure that may include layers of thin sheet steel or other magnetically permeable material coated with or separated by material having high electrical resistivity. The sheet steel should have minimal residual magnetism. The laminations are generally planar in planes defined by the structure cylindrical-coordinate, radial-angular directions; but may be planar i n planes defined generally by the structure cylindrical-coordinate, radial-axial directions. The axial direction of the structure is defined to coincide with the center of shaft 6.

Where more than one concentrator 7 is used, stator windings 12 should generally span one-half of the angular distance between identical points on the concentrators 7. At the end of stator 15 adjacent to connector 4, the end segment of each winding 12 should, as a general rule, be consistently directed such that all of the balanced, phased currents designated as positive flow in either the clockwise or counterclockwise direction. That general rule applies to two-phase machines if those machines are treated as having four phases. As illustrated in FIG. 4, one half of the connector-end segments of the windings of each of the two phases should be directed clockwise, the other half directed counterclockwise, resulting in the four-phase configuration that complies with the general rule.

While only one such winding 12 is indicated for illustration purposes in each of the embodiments of FIGS. 1, 4 and 5, multiple phased windings should be used, subject to the restriction discussed above, according to the various techniques that are well known in the art. The known design techniques involve several factors, including the number of phases of and the magnitudes of the operating voltages and currents, the maximum magnetic flux density and corresponding stator core 9 dimensions, the conductivity of the winding materials, the number of series or parallel connections for windings 12, and the shape of concentrators 7.

In manner similar to that used in construction of prior-art machines, windings 12 should be positioned to produce fields from phase-balanced currents that result in a combined field having constant rotational magnitude. Also as known from prior-art machine design, energy losses in rotor means 1 will be minimized by narrowing the slot 11 openings at the surface of core 9. Narrowing the slot 11 openings, however, increases the leakage flux associated with windings 12.

For some applications, stator core 9 may include windings 12 molded in a rigid cylindrical configuration using ferrous composite material or using non-ferrous, non-conducting material in a form as illustrated in FIG. 5. If non-ferrous material is used, the cylindrical configuration should have a short radial thickness in order to minimize the distance between inner and outer rotor poles 2 and 3. Because of the relatively short radial thickness, rotor means 1 may be constructed in parts that assemble and disassemble to allow space for and access to field winding 14, also as illustrated in FIG. 5 in which outer pole 3 is detachable.

When compared to equivalent conventional stator cores constructed of similar materials and having similar speed, frequency and electrical specifications, stator 8 may require either twice the number of turns in each winding 12 or twice the axial length of core 9 in order to limit the maximum magnetic flux density in core 9 to the same value. Other compensatory design factors may be used, including an increase in both inner and outer radii of core 9. Regardless of the design option chosen, if the design objective is to decrease energy losses, and if similar types of windings, air gaps and laminated materials are used, the volume of core 9 may generally be the same as that of an equivalent-capacity conventional machine. For example, if the design option chosen calls for increasing the number of turns in each winding 12 over those used in a similar conventional machine, the depth of slots 11 may generally be increased without changing other core dimensions of the similar conventional machine. The increase in depth of slots 11 may decrease the leakage flux associated with each individual winding and 12 will not adversely affect operation because the magnetic fields are primarily radial in direction. If the design option chosen is to increase the length of core 9 over that used in a similar conventional machine, then the radial thickness may be decreased to maintain essentially the same volume as that of the core of the similar conventional machine. Because of operation outside of the major hysteresis loop causes lower hysteresis loss per unit volume, construction using the same core volume and material as those of an equivalent conventional machine will result in less total hysteresis loss.

Because the magnetic field in core 9 is primarily radial in direction, core 9 may be fabricated from arc-shaped segments mounted on a suitable circular framework. The arc-shaped segments and windings 12 may be designed for removal and replacement for repair purposes.

Stator means 8 includes a positioning means 10 that engages rotor positioning means 6 of rotor means 1 to position the cylindrical surfaces of stator core 9 concentrically between inner and outer poles 2 and 3, preferably such that the air gaps between core 9 and poles 2 and 3 are consistent in length throughout the gap circumferences. Stator positioning means 10 and rotor positioning means 6 may be of sleeve, ball, roller or other configurations known in the art. For certain applications, a shaft may be not be used for rotor positioning means 6 but may be used for stator positioning means 10.

Mounting means 13 of stator 8 may take the form of a housing that surrounds rotor means 1. Mounting means 13 should, for example, be formed from nonmagnetic material in at least the region extending between inner pole 2 and outer pole 3 or should be constructed such that at least one of the nearest surfaces to poles 2 and 3 is separated from that pole by a relatively long air gap.

Optional magnetic field excitation is provided in the embodiments of FIGS. 1, 2, 4 and 5 by field winding 14, which includes insulated electrical conductor 15 and is mounted at the same end of stator core 9 as the end of rotor means 1 defined by connector 4 such that conductor 15 of winding 14 is surrounded by the magnetic circuit including of poles 2 and 3, connector 4, core 9 and the air gaps between. Attaching means 16 preferably positions the conductor 15 of winding 14 at least a short distance from any magnetically permeable part, including stator core 9. Attaching means 16 may attach field winding 14 to the end segments of stator windings 12, rather than directly to stator core 9. The ends of insulated conductor 15 extend from field winding 14 along or through the length of preferably the same slot 11 of stator core 9 to provide a means for connection to a source of direct current, which may be variable in magnitude and may be internally or externally generated using well-known methods.

Attaching means 16 may also attach stator core 9 to stator positioning means 10 and either to mounting means 13 or to a reference structure and may include bolts extending through slots 11 of core 9 and mounting means 13. If bolts 16 extend through the length of core 9, then bolts 16 should preferably be composed of material having a very high electrical resistivity. If such bolts 16 are electrically conductive, then bolts 16 should be insulated from other electrically conductive parts by surrounding material having very high electrical resistivity to prevent undesired current flow from the voltages that are induced along the lengths of bolts 16 by the time-varying rotor and stator magnetic fields. To minimize the possibility of undesired current flow, the number of bolts 16 should be equal to the number of concentrators 7 and the bolts 16 should be spaced uniformly around an end circumference of stator core 9. If insulated conducting bolts 16 are used, each bolt 16 may be electrically grounded at one end, for example, to mounting means 13 or to a reference structure. The same considerations apply to use of clamps or other devices for attaching means 23. Attaching means 16 must be of sufficient size, number and material strength such that it will withstand the torque requirements of the structure during operation.

An excitation field may be provided by a separately constructed and permanently magnetized rotor connector 4, as illustrated in FIG. 4. The permanent magnetization should be such that the residual magnetic field is directed primarily in the radial direction within connector 4, whether in spoke or other form, in the region between poles 2 and 3. Alternatively, excitation may be eliminated and the machine may be operated as a reluctance motor. Excitation may also be provided by mounting a rotating field winding 14 on connector 4 between poles 2 and 3 on the side adjacent to stator 8 and by using brush connections to transmit current through conductor 15 from a direct-current source of energy.

Figure 6:
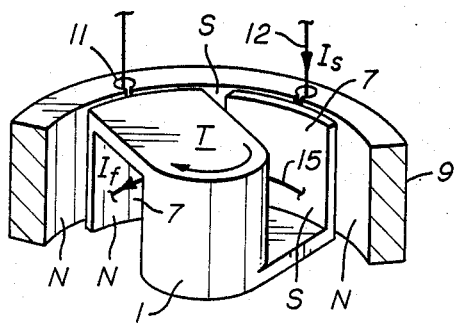
FIGS. 6 and 7 illustrate the difference between a typical prior-art structure and the structure of this invention insofar as torque-current relationship is concerned.
Figure 7:
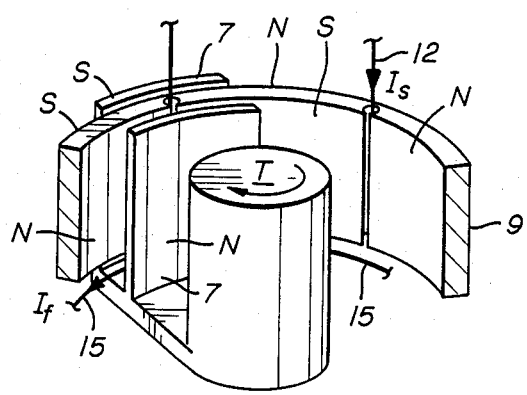

FIGS. 6 and 7 illustrate, in over-simplified form, the difference between operation of typical prior-art devices and the operation of the structure of this invention insofar as current-torque relationship is concerned. The illustrations are not intended to show construction methods or to explain speed-voltage relationships, both of which have been discussed previously. The currents in field conductors 15 of FIGS. 6 and 7 induce magnetic fields in rotors 1, as indicated by the north poles N and south poles S designated on concentrators 7. Similarly, the currents in stator windings 12 of FIGS. 6 and 7 induce magnetic fields in stator cores 9 as indicated by north poles N and south poles S. In both illustrations, torque results from attraction of opposite poles and repulsion of like poles. As is known in the art, actual torque for either configuration is the incremental change in airgap field energy divided by the corresponding incremental angular change.

In summary, FIGS. 1 and 2 have been used to illustrate operation of a typical embodiment of this invention. FIG. 3 illustrates a second embodiment of rotor means 1 for the device of FIGS. 1 and 2, indicating construction of concentrators 7 with non-uniform-length air gaps between the outer surfaces of concentrators 7 and the inner surface of stator core 9.

Also in summary, FIG. 4 illustrates an embodiment of this invention for application at a speed-frequency ratio equal to 30 revolutions per minute per Hertz and demonstrates configuration using other methods of fabrication. Similar numbers are used to indicate the functional parts illustrated in FIG. 1. In the illustrated embodiment, connector 4 is composed of material permanently magnetized in the radial direction and is used for excitation rather than a field winding 14. Outer pole 3 includes concentrators 6, which are half-wave sinusoidally shaped with uniform-length air gaps between rotor 1 and stator core 8. Slots 11 for stator windings 12, only one of which is illustrated, are arranged for two-phase operation.

Again in summary, FIG. 5 illustrates an embodiment of this invention for frequency and power applications in which eddy-current and hysteresis losses associated with laminated cores cannot be tolerated. Stator core 9 includes windings 12 formed in or on a plastic or ceramic material having relatively small eddy current and hysteresis loss characteristics. Rotor means 1 is illustrated using construction with concentrators 7 both on inner pole 2 and on a separately fabricated outer pole 3. The separate fabrication of outer pole 3 permits access to field winding 14, which has a larger radial thickness than stator core 9.

The illustrations and descriptions are intended to describe embodiments of both the invention and the components of the invention. The component embodiments as generally described are interchangeable among the invention embodiments.

The embodiments described above and indicated in the drawings are illustrative and are not to be interpreted in a limiting sense. Many variations, modifications and substitutions may be made without departing from the scope of the claimed invention. Certain of those variations, modifications and improvements may be patentable, yet fall within the claims of this invention.

I claim:

1. An alternating-current, synchronous machine structure including a rotor and a stator;
   wherein said rotor includes
      a cylindrical inner-pole member,
      a cylindrical outer-pole member,
      an annular pole-connecting means to which said pole members are attached concentrically on one side, and
      a concentrically attached rotor positioning means;
   wherein said stator includes
      a hollow cylindrical stator core having inner- and outer-cylindrical surfaces,
      a plurality of phases alternating-current windings mounted on said stator core,
      a concentrically attached stator positioning means for engaging said rotor positioning means, and
      a magnetic field winding;
   wherein said field winding is attached to the end of said cylindrical stator core such that said field winding is located between said pole-connecting means and said core;
   wherein at least one of said cylindrical pole members further includes at least one magnetic field concentrator member;
   wherein said rotor is rotatably and concentrically positioned with respect to said stator means by said rotor positioning means and said stator positioning means such that an air gap is formed between said inner-pole member and said inner-cylindrical surface of said stator core and such that an air gap is formed between said outer-pole member and said outer-cylindrical surface of said stator core;
   wherein said magnetic field concentrator causes a magnetic flux density to be non-uniform around at least one of said cylindrical surfaces; and
   wherein the pole members and at least the portion of said pole-connecting means between said pole members further include material having relatively high magnetic permeability.

2. The structure of claim 1 in which one of said rotor positioning means and said stator positioning means includes a shaft.

3. The structure of claim 1 wherein the two ends of the conductor included in said field winding extend through the length of said core.

4. The structure of claim 1 without said field winding wherein field excitation is furnished by a region of said pole-connecting means between said pole members, which region includes material that is permanently magnetized in primarily the radial direction.

5. The structure of claim 1 in which said rotor, rather than said stator, further includes said field winding attached to said pole-connecting means adjacent to said stator core.

6. The structure of claim 1 in which said concentrator member is sinusoidally shaped.

7. The structure of claim 1 in which said concentrator member is half-sinusoidally shaped.

8. The structure of claim 1 in which said concentrator member is trapezoidal-shaped.

9. The structure of claim 1 in which said air gap between said concentrator member and said stator core is of non-uniform length.

10. The structure of claim 1 in which said air gap between said concentrator member and said stator core is of non-uniform length and said concentrator is a longitudinal bar-shaped member that is attached to the surface of said cylindrical pole member adjacent to said stator core.

11. The structure of claim 1 in which said stator core contains slots for mounting said alternating-current windings and in which said slots extend substantially through the radial thickness of said stator core.

12. The structure of claim 1 in which said stator core includes laminated magnetically permeable material with the laminations separated by material having high electrical resistivity, said laminations being planar in planes defined by the structure cylindrical-coordinate, radial-angular directions.

13. The structure of claim 1 in which said stator core includes laminated magnetically permeable material with the laminations separated by material having high electrical resistivity, said laminations being planar in planes generally defined by the structure cylindrical-coordinate, radial-axial directions.

14. The structure of claim 1 in which said stator core includes non-ferrous material molded with said alternating-current windings.

15. The structure of claim 1 in which said stator core includes ferrous composite material molded with said alternating-current windings.

16. The structure of claim 1 in which the end segments of said alternating-current windings located adjacent to said pole-connecting means are directed such that balanced positive currents having three or more phases flow in only one of the clockwise or counter-clockwise directions, wherein two-phase balanced currents shall be considered as having four phases.

17. The structure of claim 1 including a plurality of bolts extending through the length of said stator core, said bolts being composed of material having high electrical resistivity.

18. The structure of claim 1 including a plurality of bolts extending through the length of said stator core, said bolts being composed of electrically conductive material and said bolts being surrounded by material having high electrical resistivity.

19. The structure of claim 1 including a plurality of bolts extending through the length of said stator core, the number of said bolts being equal to the number of said concentrator members and said bolts being uniformly spaced around an end circumference of said stator core.

20. The structure of claim 1 in which said pole-connecting means is an annular disc with concentric cylindrical extensions.

21. The structure of claim 1 in which said pole-connecting means is an annular disc with concentric cylindrical extensions, the outer extension of which has a plurality of ventilation holes located around its circumference.

22. The structure of claim 1 in which said pole-connecting means includes a plurality of spokes.

23. The structure of claim 1 in which at least one of said pole members is detachable from said pole-connecting.

* * * * *

UNITED STATES PATENT AND TRADEMARK OFFICE
CERTIFICATE OF CORRECTION

PATENT NO. : 4,831,300

DATED : May 16, 1989

INVENTOR(S) : Theodore D. Lindgren

It is certified that error appears in the above-identified patent and that said Letters Patent is hereby corrected as shown below:

Col. 2, line 51, "an" should be --and--.

Col. 3, line 50, "sots" should read --slots--.

Col. 4, line 39, "cludes" should be --clude--.

Col. 5, line 34, "to" should be deleted.

Col. 8, line 29, "of" should be deleted.

Col. 10, line 23, "phases" should be --phased--.

Col. 10, line 36, "means" should be deleted.

Signed and Sealed this

Thirtieth Day of January, 1990

Attest:

JEFFREY M. SAMUELS

*Attesting Officer*     *Acting Commissioner of Patents and Trademarks*